United States Patent [19]

Jankevics

[11] Patent Number: 4,955,669
[45] Date of Patent: Sep. 11, 1990

[54] WHEEL BEARING ARRANGEMENT FOR SUCTION CLEANER

[75] Inventor: Jan T. Jankevics, Vällingby, Sweden

[73] Assignee: Aktiebolaget Electrolux, Stockholm, Sweden

[21] Appl. No.: 346,800

[22] Filed: May 3, 1989

[30] Foreign Application Priority Data

May 20, 1988 [SE] Sweden .................................. 8801909

[51] Int. Cl.⁵ .............................................. B60B 19/00
[52] U.S. Cl. ........................................ 301/1; 301/5 R; 301/63 PW; 301/111; 301/124 R
[58] Field of Search ............. 301/1, 5 R, 63 PW, 111, 301/112, 118, 119, 122, 125, 126, 131, 124 R, 124 A; 16/18 R, 45, 46, 31 A

[56] References Cited

U.S. PATENT DOCUMENTS

| | | | |
|---|---|---|---|
| 3,813,054 | 5/1974 | Klingspor | 301/112 X |
| 3,977,040 | 8/1976 | Sugasawara | 16/45 |
| 4,509,227 | 4/1985 | Keane | 16/45 X |
| 4,530,543 | 7/1985 | Keane | 16/45 X |
| 4,546,512 | 10/1985 | Liebscher et al. | 301/111 X |

FOREIGN PATENT DOCUMENTS

| | | | |
|---|---|---|---|
| 939462 | 1/1974 | Canada | 16/31 A |
| 3034457 | 4/1982 | Fed. Rep. of Germany | 16/46 |

Primary Examiner—Russell D. Stormer
Attorney, Agent, or Firm—Pearne, Gordon, McCoy & Granger

[57] ABSTRACT

In a wheel bearing arrangement for a suction cleaner, the wheel (20) has on its inside a shaft (21) cooperating with bearing surfaces (12,14) in the suction cleaner housing (10) and a bottom portion (15) thereof, respectively. According to the invention, the housing (10) comprises a supporting wall (16) extending along the outside of the wheel and having a bearing member (17) cooperating with a pivot (22) provided on the outside of the wheel.

3 Claims, 2 Drawing Sheets

WHEEL BEARING ARRANGEMENT FOR SUCTION CLEANER

BACKGROUND OF THE INVENTION

The present invention relates to a wheel bearing arrangement for a suction cleaner, in which the wheel has a shaft made integral therewith on its inside, the suction cleaner comprising a first housing portion provided with a first bearing member having a first bearing surface enclosing half the circumference of the shaft, and a second housing portion provided with a second bearing member having a second bearing surface enclosing the remaining half circumference of the shaft.

SUMMARY OF THE INVENTION

The object of the invention is to provide a bearing arrangement comprising few parts and allowing rapid and simple mounting of the wheel and also providing a stable wheel bearing having a high resistance to mechanical loading. This has been obtained by means of a bearing arrangement of the kind mentioned in the introduction which according to the invention is characterized in that the wheel has a pivot on its outside and that the first housing portion comprises a supporting wall extending along the outside of the wheel and having a third bearing member cooperating with said pivot.

BRIEF DESCRIPTION OF THE DRAWINGS

The invention will be described in more detail in the following with reference to the accompanying drawing on which

DETAILED DESCRIPTION OF THE PREFERRED EMBODIMENT

Figure 1:
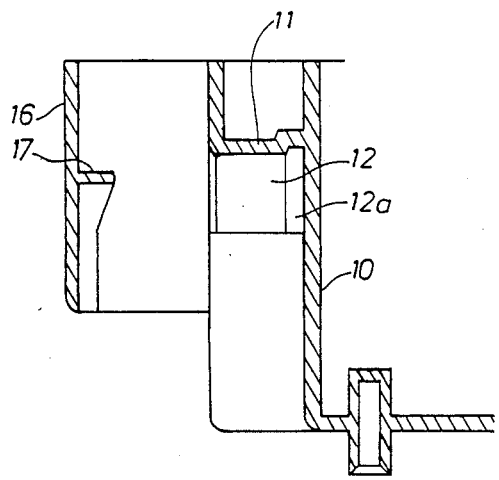
FIG. 1 illustrates a partial section of a suction cleaner housing comprising a first portion of the bearing arrangement according to the invention.
Figure 2:
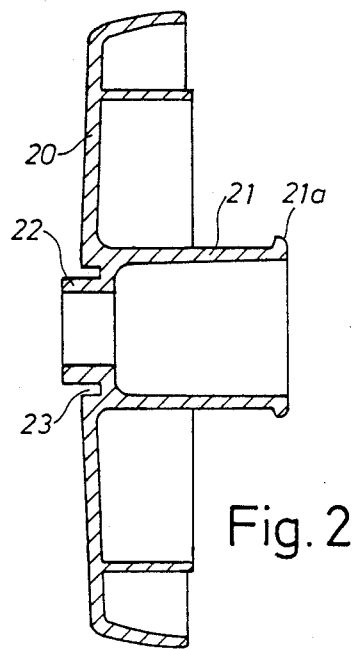
FIG. 2 is a section of a wheel.
Figure 3:
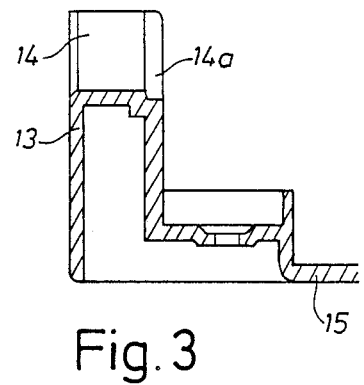
FIG. 3 illustrates a partial section of the bottom portion of the cleaner housing including a second bearing portion.

The portion of the cleaner housing shown in FIG. 1 is designated 10 and comprises a first bearing member 11 having a bearing surface 12 which cooperates with a corresponding bearing member 13 having a bearing surface 14 in the bottom portion 15 (FIG. 3). The housing portion 10 has also an outer supporting wall 16 provided with a third bearing member 17.

The wheel 20 has on its inside a shaft 21 with a flange 21a adapted to be received in a corresponding groove 12a, 14a in the bearing members 11 and 13, respectively. On its outside the wheel has a pivot 22 surrounded by an annular groove 23.

Figure 4:
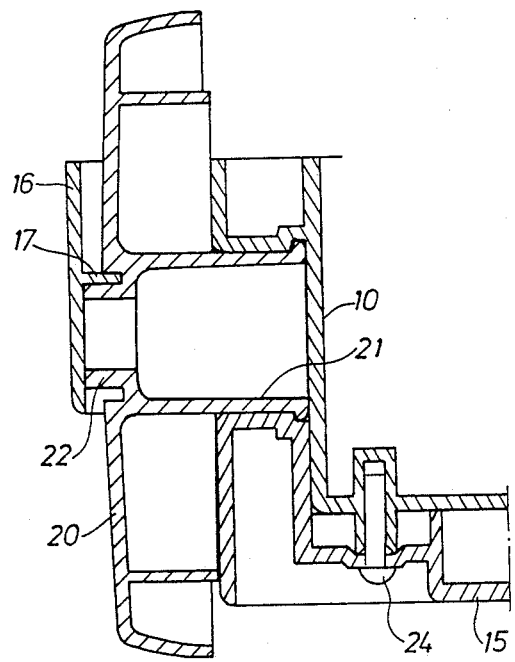
FIG. 4 is an axial section of the bearing arrangement in assembled condition.

When the bearing arrangement is to be assembled, the wheel 20 is inserted into the housing portion 10 until the shaft 21 engages the bearing surface 12. During insertion of the wheel the outer supporting wall 16 yields resiliantly until the bearing member 17, which has an inverted U-form, snaps into the groove 23. Due to the engagement of the bearing member 17 in the groove 23 the wheel is held in this portion which facilitates the mounting operation. The bottom housing portion 15 is subsequently mounted under the housing portion 10 and is fastened by means of a screw 24. The bearing arrangement is thereby complete, as appears in FIG. 4.

In the assembled condition, the bearing member 17 cooperating with the pivot 22 contributes in taking up loading on the wheel during operation. Consequently, in addition to the facilitating of the assembly, the bearing member 17 also contributes to increasing the mechanical strength of the structure. Furthermore, the supporting wall 16 protects the outside of the wheel from mechanical damage.

I claim:

1. Wheel bearing arrangement for a suction cleaner, in which a wheel (20), having an inside and an outside, has a shaft (21) made integral therewith on its inside, the suction cleaner comprising a first housing portion (10) provided with a first bearing member (11) having a first bearing surface (12) enclosing half the circumference of the shaft, and a second housing portion (15) provided with a second bearing member (13) having a second bearing surface (14) enclosing the remaining half circumference of the shaft, wherein the wheel (20) has a pivot (22) on its outside and that the first housing portion (10) comprises a supporting wall (16) extending along the outside of the wheel and having a third bearing member (17) cooperating with said pivot (22).

2. Wheel bearing arrangement according to claim 1, wherein an annular groove (23) is provided around the pivot (22) and that the third bearing member (17) comprises an arcuate flange engaging said groove.

3. Wheel bearing arrangement according to claim 2, wherein the supporting wall (16) is resilient in order to yield during mounting of the wheel (20) until the flange (17) snaps into the groove (23).

* * * * *